(12) United States Patent
Sanada et al.

(10) Patent No.: US 9,170,673 B2
(45) Date of Patent: Oct. 27, 2015

(54) ELECTRONIC DEVICE AND METHOD OF DATA TRANSMISSION

(71) Applicant: NIKON CORPORATION, Tokyo (JP)

(72) Inventors: Satoru Sanada, Chigasaki (JP); Mikiya Tanaka, Chigasaki (JP)

(73) Assignee: NIKON CORPORATION, Tokyo (JP)

( * ) Notice: Subject to any disclaimer, the term of this patent is extended or adjusted under 35 U.S.C. 154(b) by 181 days.

(21) Appl. No.: 13/775,629

(22) Filed: Feb. 25, 2013

(65) Prior Publication Data

US 2013/0234956 A1 Sep. 12, 2013

Related U.S. Application Data

(63) Continuation of application No. PCT/JP2011/070025, filed on Sep. 2, 2011.

(30) Foreign Application Priority Data

Sep. 2, 2010 (JP) .................................. 2010-196741

(51) Int. Cl.

| G06F 3/041 | (2006.01) |
| G06F 3/0488 | (2013.01) |
| H04M 1/725 | (2006.01) |
| G06F 3/01 | (2006.01) |

(52) U.S. Cl.
CPC .............. *G06F 3/0412* (2013.01); *G06F 3/016* (2013.01); *G06F 3/0488* (2013.01); *H04M 1/72522* (2013.01); *H04M 1/7253* (2013.01); *H04M 1/72555* (2013.01); *H04M 2250/22* (2013.01)

(58) Field of Classification Search
CPC .... G06F 3/0233; G06F 3/017; H04M 1/7253; H04M 2250/12; H04M 2250/22
USPC .................... 345/156–184; 178/18.01–20.04; 340/407.1, 407.2
See application file for complete search history.

(56) References Cited

U.S. PATENT DOCUMENTS

2004/0150724 A1 8/2004 Nozaki et al.
2007/0282678 A1* 12/2007 Dendi et al. ..................... 705/14

(Continued)

FOREIGN PATENT DOCUMENTS

| JP | A-2004-235782 | 8/2004 |
| JP | A-2010-182046 | 8/2010 |

OTHER PUBLICATIONS

Nov. 22, 2011 International Search Report issued in International Application No. PCT/JP2011/070025 (with translation).

(Continued)

*Primary Examiner* — Abbas Abdulselam
*Assistant Examiner* — Gerald Oliver
(74) *Attorney, Agent, or Firm* — Oliff PLC

(57) ABSTRACT

A terminal device (electronic device) includes a display which displays an image that specifies data, a touch panel which is disposed on the display and detects a contact of an object, a transmission operation detection unit which, when the display displays the image that specifies data, detects that a transmission operation has been performed with respect to the data if the touch panel detects a contact that continues over at least a predetermined distance and is in a predetermined direction, and a data transmission unit which, when the transmission operation detection unit detects the transmission operation, transmits the data to another electronic device.

14 Claims, 9 Drawing Sheets

(56) References Cited

U.S. PATENT DOCUMENTS

| | | | |
|---|---|---|---|
| 2009/0270046 A1* | 10/2009 | Lai | 455/73 |
| 2010/0079672 A1* | 4/2010 | Bae et al. | 348/565 |
| 2010/0156812 A1* | 6/2010 | Stallings et al. | 345/173 |
| 2010/0281363 A1* | 11/2010 | Inaba | 715/702 |
| 2011/0285658 A1 | 11/2011 | Homma et al. | |
| 2011/0291964 A1* | 12/2011 | Chambers et al. | 345/173 |

OTHER PUBLICATIONS

Nov. 22, 2011 Written Opinion issued in International Application No. PCT/JP2011/070025.

* cited by examiner

FIG. 3

| INTER-TERMINAL DISTANCE | DELAY TIME Td |
|---|---|
| LESS THAN 10m | 0 |
| 10m OR MORE AND LESS THAN 50m | 2 |
| 50m OR MORE | 4 |

FIG. 4

| ATTITUDE ANGLE | EFFECT SOUND NUMBER |
|---|---|
| $\theta < 30$ [deg] | 1 |
| $30 <= \theta < 60$ [deg] | 2 |
| $\theta >= 60$ [deg] | 3 |

FIG. 5

| TRANSFER SPEED | VOLUME LEVEL | VIBRATION LEVEL |
|---|---|---|
| LESS THAN 50mm/sec | 1 (SMALL) | 1 (SMALL) |
| 50mm/sec OR MORE AND LESS THAN 100mm/sec | 3 (MIDDLE) | 3 (MIDDLE) |
| 100mm/sec OR MORE | 5 (LARGE) | 5 (LARGE) |

FIG. 6

| DELAY TIME | EFFECT SOUND NUMBER | VOLUME LEVEL | VIBRATION LEVEL |
|---|---|---|---|
| 3 | 2 | 3 | 3 |

FIG. 7

| OBJECT NUMBER | REPLAYING VOLUME | VIBRATION AMPLITUDE |
|---|---|---|
| LESS THAN 100 | MAXIMUM VOLUME × OBJECT NUMBER/100 | RATED AMPLITUDE × OBJECT NUMBER/100 |
| 100 OR MORE | DEFINED VOLUME | RATED AMPLITUDE |

ELECTRONIC DEVICE AND METHOD OF DATA TRANSMISSION

CROSS-REFERENCE TO RELATED APPLICATION

This is a Continuation application of International Application No. PCT/JP2011/070025, filed Sep. 2, 2011, which claims priority to Japanese Patent Application No. 2010-196741 filed on Sep. 2, 2010. The contents of the aforementioned applications are incorporated herein by reference.

BACKGROUND

1. Field of the Invention

The present invention relates to an electronic device and a method of data transmission.

2. Description of Related Art

Currently, a digital camera and a mobile phone with a camera are in widespread use, thus making it possible for anyone to simply take a picture anywhere. Further, in Japanese Unexamined Patent Application No. 2004-235782, a digital camera capable of wirelessly communicating with another camera is disclosed.

SUMMARY

However, in a case of transmitting photos taken with the digital camera to friends or acquaintances, there is a problem in that photo transmission is a time- and labor-intensive operation. For example, since in the digital camera, a medium such as a SD (Secure Digital) card has to be replaced or photo data has to be first transferred to a personal computer, it is cumbersome. Further, even in a case of transmitting a photo in a wireless communication using a digital camera disclosed in Japanese Unexamined Patent Application No. 2004-235782, it is necessary for the user to first open a menu screen, and perform an operation such as selection of a transmission item from the menu. On the other hand, in a mobile phone, it is common to transmit a photo by infra-red rays or to send an e-mail with a photo attached. In this case, it is necessary to perform an operation to start an infra-red communication or an operation to attach a photo in an e-mail.

The object of an aspect of the present invention is to provide an electronic device and a method of data transmission capable of transmitting an object such as a photo to another electronic device in a simple and intuitive operation.

An aspect of the present invention is an electronic device including: a display which displays an image that specifies data, a touch panel which is disposed on the display and detects a contact of an object, a transmission operation detection unit which, when the display displays the image that specifies data, detects that a transmission operation to transmit the data has been performed if the touch panel detects a contact that continues over at least a predetermined distance and is in a predetermined direction; and a data transmission unit which transmits the data to another electronic device if the transmission operation detection unit detects the transmission operation.

According to the aspect of the present invention, it is possible for a user to transmit data such as a photo to another electronic device in a simple and intuitive operation.

BRIEF DESCRIPTION OF THE DRAWINGS

FIG. 3 is a schematic diagram illustrating a data structure and a data example of a delay time table according to the present embodiment.

FIG. 4 is a schematic diagram illustrating a data structure and a data example of an effect sound table according to the present embodiment.

FIG. 5 is a schematic diagram illustrating a data structure and a data example of a volume vibration level table according to the present embodiment.

FIG. 6 is a schematic diagram illustrating a data structure and a data example of control information according to the present embodiment.

FIG. 7 is a schematic diagram illustrating a data structure and a data example of an operation pattern table according to the present embodiment.

DESCRIPTION OF EMBODIMENTS

Figure 1:
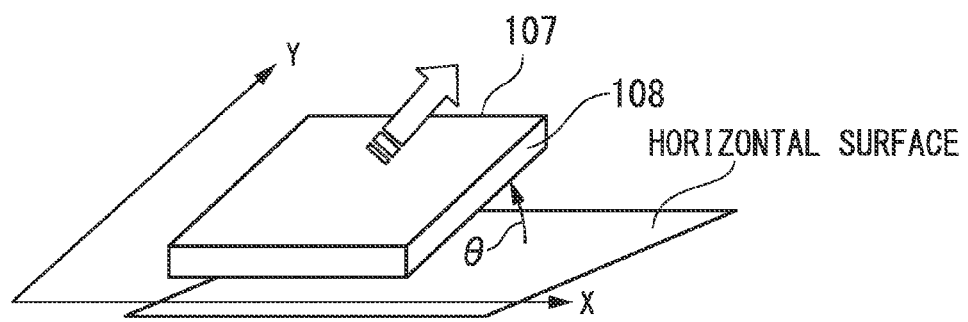
FIG. 1 is a configuration diagram illustrating an appearance of a display of a terminal device according to the present embodiment.

Hereinafter, a description of an embodiment of the present invention is made referring to the drawings.

FIG. 1 is a configuration diagram illustrating an appearance of a display 108 of the terminal device according to the present embodiment.

Here, in the display 108, an XY coordinate system is defined, in which a right direction is a positive direction of an X axis and an upper direction is a positive direction of a Y axis when viewed from the front. Further, an angle θ of the terminal device with respect to a horizontal surface (horizontal direction) is defined as an attitude angle. A touch panel (for example, including a pressure-sensitive type, an electrostatic type, and an acoustic wave type) 107 is provided in the upper part of the display 108. If the touch panel 107 receives pressure from above by a body part such as a hand or a finger, or an object such as a pen, the touch panel 107 receives a touch operation by detecting a position thereof (an XY coordinate value).

Figure 2:
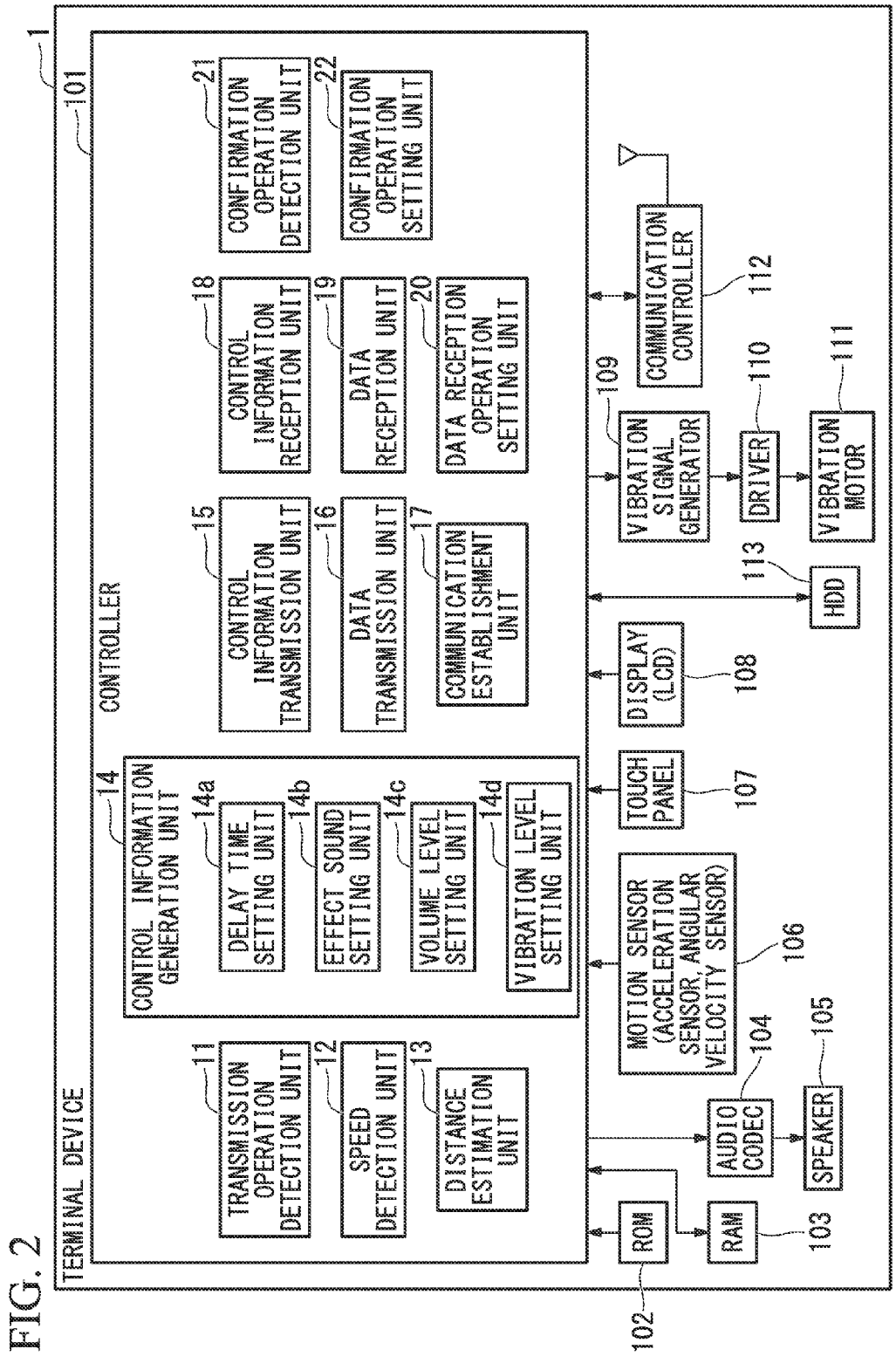
FIG. 2 is a block diagram illustrating a configuration of the terminal device according to the present embodiment.

FIG. 2 is a block diagram illustrating a configuration of the terminal device 1 according to the present embodiment.

The terminal device 1 transceives an object that is data such as an image, a moving image, an audio, or a vibration, with another terminal device 1. For example, the terminal device 1 is an electronic device such as a mobile phone, a smart phone, and a digital camera. As shown in FIG. 2, the terminal device 1 is configured to include a controller 101, a ROM (Read-Only Memory) 102, a RAM (Random Access Memory) 103, an audio codec 104, a speaker 105, a motion sensor 106, a touch panel 107, a display 108, a vibration signal generator 109, a driver 110, a vibration motor 111, a communication controller 112, and a HDD (Hard disk drive) 113. When the display 108 displays an image that specifies an object, in a case where the user performs a stroke operation with a finger, or the like in the touch panel 107 region towards the Y-axis positive direction, the terminal device 1 transmits the object to another terminal device 1. Further, in a case where the user performs an operation of shaking the terminal device 1, the terminal device 1 generates vibration and an effect sound corresponding to an object amount that the terminal device 1 holds. In addition, a memory card may be used instead of the HDD 113.

The controller 101 is a CPU (Central Processing Unit), and includes a transmission operation detection unit 11, a speed detection unit 12, a distance estimation unit 13, a control information generation unit 14, a control information transmission unit 15, a data transmission unit 16, a communication establishment unit 17, a control information reception unit 18, a data reception unit 19, a data reception operation setting unit 20, a confirmation operation detection unit 21, and a confirmation operation setting unit 22 to integrally control the terminal device 1.

The transmission operation detection unit 11 detects that the transmission operation has been performed with respect to the object. The transmission operation is a stroke operation in the touch panel 107 region toward the Y-axis positive direction that is performed by the finger of the user, when the display 108 displays the image that specifies the object. That is, when the display 108 displays the image that specifies the object, in a case where the touch panel 107 detects a contact that continues over at least a predetermined distance and is in the Y-axis positive direction (a predetermined direction), the transmission operation detection unit 11 detects that the transmission operation has been performed with respect to the object. Further, when the display 108 displays the image that specifies the object, in a case where the touch panel 107 detects the contact in the predetermined direction and the predetermined direction is the same as the direction in which another terminal device 1 is located, the transmission operation detection unit 11 may detect that the transmission operation has been performed with respect to the object. Here, for example, if the object is an image or a moving image, the image that specifies the object is defined as the image or the moving image itself. Further, if the object is an audio or a vibration, the object is defined as an icon which specifies the audio or the vibration. In addition, in the present embodiment, in a case where the user performs a stroke operation toward the Y-axis positive direction, the transmission operation detection unit 11 detects that the transmission operation has been performed. However, without being limited thereto, the direction may be, for example, the Y-axis negative direction, the X-axis positive direction, and the X-axis negative direction. Otherwise, the transmission operation detection unit 11 may detect the direction of the terminal device 1 by the motion sensor 106 and determine that the transmission operation has been performed in a case where the user performs a stroke operation in the upper direction (otherwise, the right direction or the left direction) with respect to the ground. In addition, instead of the image that specifies the object being displayed on the display 108, information (for example, a file name of a data file, and the like) which specifies the object may be displayed on the display 108.

The speed detection unit 12 detects a speed (hereinafter, referred to as a transfer speed) of the transmission operation with respect to the object, based on the position and the time in which the touch panel 107 detected a contact. The distance estimation unit 13 acquires the radio field intensity from the communication controller 112 at the time of establishing a wireless communication, and estimates the distance (hereinafter, referred to as an inter-terminal distance) between the host terminal device 1 and another terminal device 1 according to the acquired radio field intensity. Specifically, the distance estimation unit 13 estimates that the inter-terminal distance is within 10 m, in a case where the radio field intensity is strong (a predetermined value a or more). Further, the distance estimation unit 13 estimates that the inter-terminal distance is from 10 m to 50 m, in a case where the radio field intensity is about medium (a predetermined value b (<a) or more and less than a). Further, the distance estimation unit 13 estimates that the inter-terminal distance is 50 m or more in a case where the radio field intensity is weak (less than b).

The control information generation unit 14 generates control information to control the operation when another terminal device 1 receives the object. The control information generation unit 14 includes a delay time setting unit 14a, an effect sound setting unit 14b, a volume level setting unit 14c, and a vibration level setting unit 14d. The delay time setting unit 14a sets a delay time which is a time from when another electronic device 1 receives the object until when the user of another electronic device 1 is notified with the reception of the object, based on the inter-terminal distance that the distance estimation unit 13 has estimated and the attitude angle that the motion sensor 106 detected. The effect sound setting unit 14b sets an effect sound that is replayed when another terminal device 1 receives the object, based on the attitude angle that the motion sensor 106 has detected. The volume level setting unit 14c sets the replaying volume of the effect sound that is replayed when another terminal device 1 receives the object, based on the transfer speed that the speed detection unit 12 has detected. The vibration level setting unit 14d sets the dimension of the vibration that is generated when another terminal device 1 receives the object, based on the transfer speed that the speed detection unit 12 has detected. The details of a method for setting the dimensions of the delay time, the effect sound, the replaying volume and the vibration will be described later. Here, the control information includes at least one of the delay time that the delay time setting unit 14a sets, the identification information of the effect sound that the effect sound setting unit 14b sets, the replaying volume that the volume level setting unit 14c sets, and the dimension of the vibration that the vibration level setting unit 14d sets.

If the transmission operation detection unit 11 detects the transmission operation with respect to the object, the data transmission unit 16 transmits the object to another terminal device 1 through the communication controller 112. Before the data transmission unit 16 transmits the object, the control information transmission unit 15 transmits the control information that the control information generation unit 14 has generated to another terminal device 1 through the communication controller 112. When the transmission operation detection unit 11 detects the transmission operation with respect to the object, the communication establishment unit 17 determines whether communication with another terminal device 1 is established. Then, in a case where communication with another terminal device 1 is not established, the communication establishment unit 17 transmits data for requesting a connection (hereinafter, referred to as a connection request) to another terminal device 1 through the communication controller 112 to establish the communication with another terminal device 1.

The data reception unit 19 receives the object from another terminal device 1 through the communication controller 112. The control information reception unit 18 receives control information from another terminal device 1 through the communication controller 112. The data reception operation setting unit 20 sets the operation at the time of reception of the object based on the control information that the control information reception unit 18 has received. Specifically, the data reception operation setting unit 20 writes the control information received by the control information reception unit 18 to the RAM 103. Further, when the data reception unit 19 receives the object, the data reception operation setting unit 20 performs the reception operation that is set based on the control information. Specifically, the data reception operation setting unit 20 reads the control information from the RAM 103 and performs an action based on the control information that has been read.

The confirmation operation detection unit 21 detects that the confirmation operation with respect to the object amount has been performed based on the acceleration and angular velocity (attitude angle) that the motion sensor 106 has detected. Specifically, the confirmation operation detection unit 21 determines that the confirmation operation with respect to the object amount has been performed, in a case where the user performs an operation to shake the terminal device 1. When the confirmation operation detection unit 21 detects the confirmation operation with respect to the object amount, the confirmation operation setting unit 22 determines the replaying volume and the vibration amplitude based on the object amount that the HDD 113 stores. Here, in the present embodiment, the object amount is the number of the object. In addition, the object amount may be the capacity of the object. Then, the confirmation operation setting unit 22 outputs the predetermined audio data to the audio codec 104 with the determined replaying volume, and outputs to the vibration signal generator 109 the signal instructing the vibration having the determined vibration amplitude to be generated.

The ROM 102 is a read-only memory which stores the program to control the terminal device 1, various tables shown below, and the like. The RAM 103 is a memory which stores various information and can be read from and written to at any time. The audio codec 104 decodes the input audio data, converts the decoded digital audio data into an analog signal, and outputs the analog signal to the speaker 105. The speaker 105 outputs the audio that is input from the audio codec 104.

The motion sensor (an attitude angle detection unit) 106 which is configured to include an acceleration sensor and an angular velocity sensor detects power acting on the terminal device 1 and outputs the data (an acceleration and an attitude angle) of the detected power to the controller 101. The touch panel 107 which is provided on the display 108 detects the contact of the object and outputs the position in which the touch is sensed to the controller 101. The display 108 is a display such as an LCD (Liquid Crystal Display), and displays an image that specifies the object. The vibration signal generator 109 outputs the defined sinusoidal wave to the driver 110 according to the signal from the controller 101. The driver 110 is a motor circuit to drive the vibration motor 111, when the sinusoidal wave is input by the vibration signal generator 109. The vibration motor (vibration element) 111 is a linear vibration actuator element to vibrate, when the sinusoidal wave (vibration waveform) of the defined frequency (resonance frequency) is input. The communication controller 112 performs a wireless communication with another terminal device 1 through an antenna. Here, the communication controller 112 performs a direct communication with another terminal device 1 over, for example, WiFi (Wireless Fidelity), and the like, without going through the access point. The HDD 113 is a memory which stores the object.

Next, a description of various tables that the ROM 102 stores will be given.

FIG. 3 is a schematic diagram illustrating a data structure and a data example of the delay time table that the ROM 102 stores according to the present embodiment. As illustrated in the figure, the delay time table is data of a two-dimensional table format configured of rows and columns, and has a column for each item of an inter-terminal distance and a delay time Td. Each row in this table exists for each distance. The inter-terminal distance is the inter-terminal distance between the host terminal device 1 and another terminal device 1. The delay time Td is the delay time (the unit thereof is second) when another terminal device 1 receives the object. In the illustrated example, the delay time Td corresponding to the inter-terminal distance of "less than 10 m" is "0" second, the delay time Td corresponding to the inter-terminal distance of "10 m or more and less than 50 m" is "2" seconds, and the delay time Td corresponding to the inter-terminal distance of "50 m or more" is "4" seconds. That is, the smaller the inter-terminal distance is, the shorter the delay time Td is, and the larger the inter-terminal distance is, the longer the delay time Td is. In addition, it may not set the delay time when another terminal device 1, which is made to correspond to the inter-terminal distance between the host terminal device 1 and another terminal device 1, receives the object.

FIG. 4 is a schematic diagram illustrating a data structure and a data example of an effect sound table that the ROM 102 stores according to the present embodiment. As illustrated in the figure, the effect sound table is data of a two-dimensional table format configured of rows and columns, and has a column for each item of the attitude angle and the effect sound number. Each row in this table exists for each attitude angle. The attitude angle is the attitude angle θ in the host terminal device 1. The effect sound number is identification information of the effect sound that is replayed when another terminal device 1 receives the object, and is an integer value of 1 or more and 3 or less. For example, the effect sound corresponding to the effect sound number 1 is a sound that sounds like the object is flying in a straight line. Further, the effect sound corresponding to the effect sound number 2 is a sound that sounds like the object flies drawing a low parabola. Further, the effect sound corresponding to the effect sound number 3 is a sound that sounds like the object flies drawing a high parabola. In the illustrated example, the effect sound number corresponding to the attitude angle "less than 30 degrees" is "1," the effect sound number corresponding to the attitude angle "30 degrees or more and less than 60 degrees" is "2," and the effect sound number corresponding to the attitude angle "60 degrees or more" is "3." In addition, it may not set the effect sound that is replayed when another terminal device 1, which is made to correspond to the attitude angle θ in the host terminal device 1, receives an object.

FIG. 5 is a schematic diagram illustrating a data structure and a data example of a volume vibration level table that the ROM 102 stores according to the present embodiment. As illustrated in the figure, the volume vibration level table is data of a two-dimensional table format configured of rows and columns, and has a column for each item of a transfer speed, a volume level and a vibration level. Each row in this table exists for each transfer speed. The volume level is the replaying volume of the effect sound that is replayed when another terminal device 1 receives the object, and is an integer value of 1 or more and 5 or less. Here, the larger the number of the volume level is, the larger the replaying volume is, and the smaller the number of the volume level is, the smaller the replaying volume is. Further, the vibration level is the dimension of the vibration that is generated when another terminal device 1 receives the object, and is an integer value of 1 or more and 5 or less. Here, the larger the number of the vibration level is, the larger the vibration (amplitude) is, and the smaller the number of the vibration level is, the smaller the vibration (amplitude) is. In an illustrated example, the volume level and the vibration level corresponding to the transfer speed of "less than 50 mm/sec" are respectively "1" and "1". Further, the volume level and the vibration level corresponding to the transfer speed of "50 mm/sec or more and less than 100 mm/sec" are respectively "3" and "3". Further, the volume level and the vibration level corresponding to the transfer speed of "100 mm/sec or more" are respectively "5" and "5". That is, the slower the transfer speed is, the smaller the replaying volume and the vibration are, and the faster the transfer speed is, the larger the replaying volume and the vibration are. In addition, it may not set the effect sound that is replayed and the vibration that is generated when another terminal device 1, which is made to correspond to the transfer speed in the host terminal device 1, receives an object.

FIG. 6 is a schematic diagram illustrating a data structure and a data example of control information according to the present embodiment. As illustrated in the figure, the control information includes a delay time, an effect sound number, a volume level, and a vibration level. Here, the delay time, the effect sound number, the volume level and the vibration level are respectively 1 byte-data. That is, the control information is 4 byte-data of a relatively small dimension. As illustrated in the figure, the delay time "3," the effect sound number "2," the volume level "3," and the vibration level "3" are included in the control information. In addition, it is not necessary for the control information to include all of the delay time, the effect sound number, the volume level and the vibration level, in contrast, the control information may include at least one of the delay time, the effect sound number, the volume level, and the vibration level. Further, the control information may not be set.

FIG. 7 is a schematic diagram illustrating a data structure and a data example of an operation pattern table that the ROM 102 stores according to the present embodiment. As illustrated in the figure, the operation pattern table is data of a two-dimensional table format configured of rows and columns, and has a column for each item of an object number, a replaying volume and a vibration amplitude. Each row in this table exists for each object number. The object number is the number of objects that the HDD 113 stores. The replaying volume is the replaying volume of the effect sound that is replayed when the confirmation operation is performed. Further, the vibration amplitude is the vibration amplitude of the vibration that is generated when the confirmation operation is performed. As illustrated in the figure, the replaying volume and the vibration amplitude corresponding to the object number "less than 100" are respectively "the maximum volume× the object number/100," and "the rated amplitude×the object number/100." Here, the maximum volume is the maximum volume of the speaker 105, and the rated amplitude is the rated amplitude of the vibration motor 111. Further, the replaying volume and the vibration amplitude corresponding to the object number "100 or more" are respectively "the defined volume," and "the rated amplitude." Here, the defined volume is the defined volume of the speaker 105. That is, the smaller the object number is, the smaller the replaying volume and the vibration are. The larger the object number is, the larger the replaying volume and the vibration are. It is not necessary to set both the replaying volume and the vibration amplitude, but at least one thereof may be set. Further, both the replaying volume and the vibration amplitude may not be set.

Figure 8:
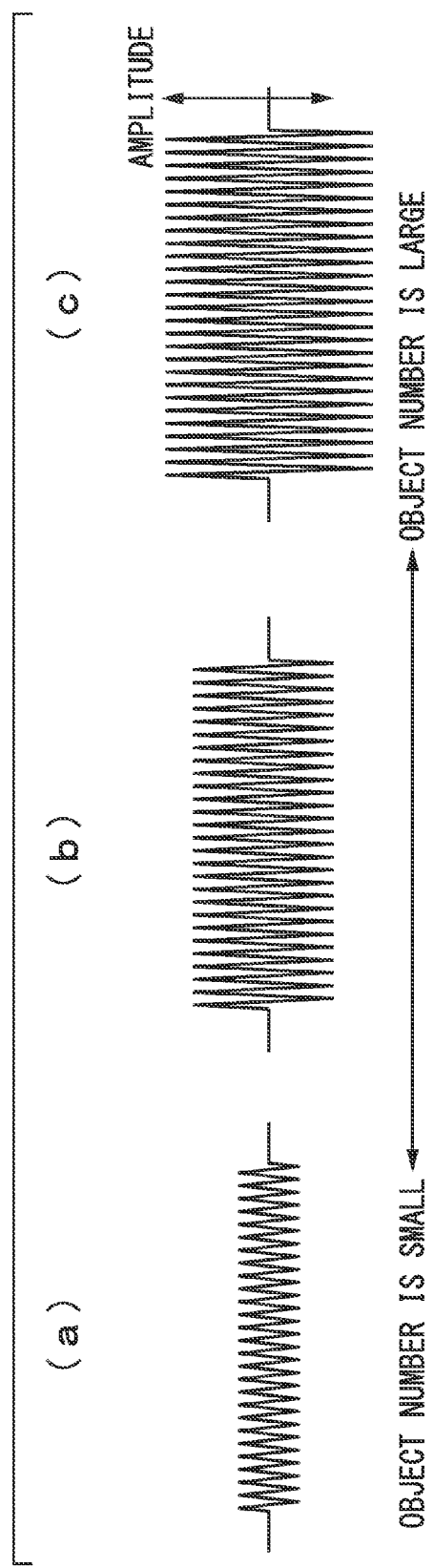
FIG. 8 is an image diagram illustrating an example of a vibration pattern at a time of a confirmation operation of an object amount according to the present embodiment.

FIG. 8 is an image diagram illustrating an example of a vibration pattern at a time of a confirmation operation of an object amount according to the present embodiment. FIG. 8(*a*) represents the image diagram of the vibration generated when the object number is small. Further, FIG. 8(*b*) represents the image diagram of the vibration generated when the object number is a typical value. Further. FIG. 8(*c*) represents an image diagram of a vibration generated when the object number is large. The vibration amplitude shown in FIG. 8(*a*) is smaller than the vibration amplitude shown in FIG. 8(*b*). The vibration amplitude shown in FIG. 8(*b*) is smaller than the vibration amplitude shown in FIG. 8(*c*). That is, in the present embodiment, the larger the object number is, the larger the vibration amplitude at a time of the confirmation operation is, and the smaller the object number is, the smaller the vibration amplitude at the time of the confirmation operation is.

Figure 9:
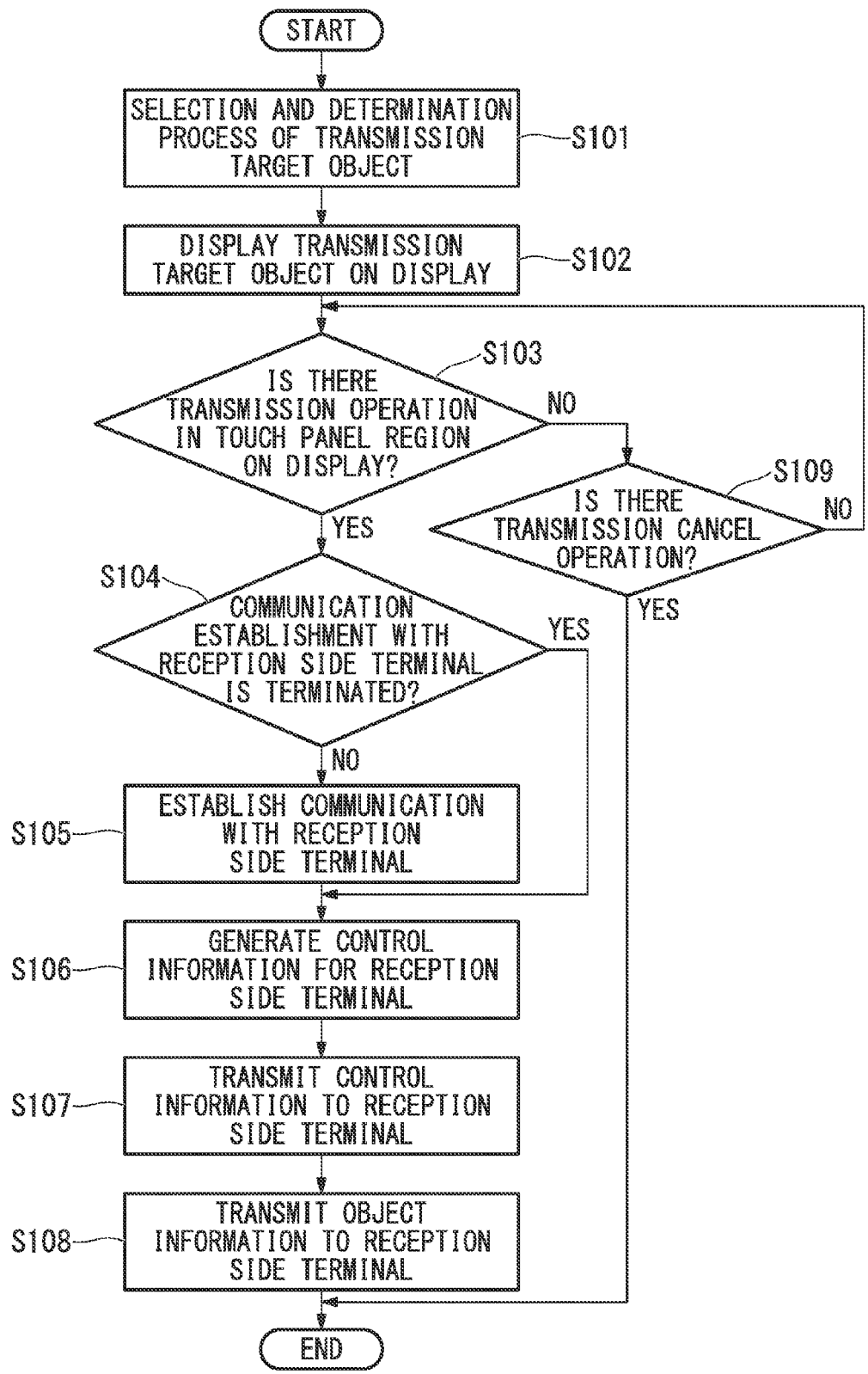
FIG. 9 is a flow chart illustrating a sequence in a transmission process in a transmission side terminal according to the present embodiment.
Figure 10:
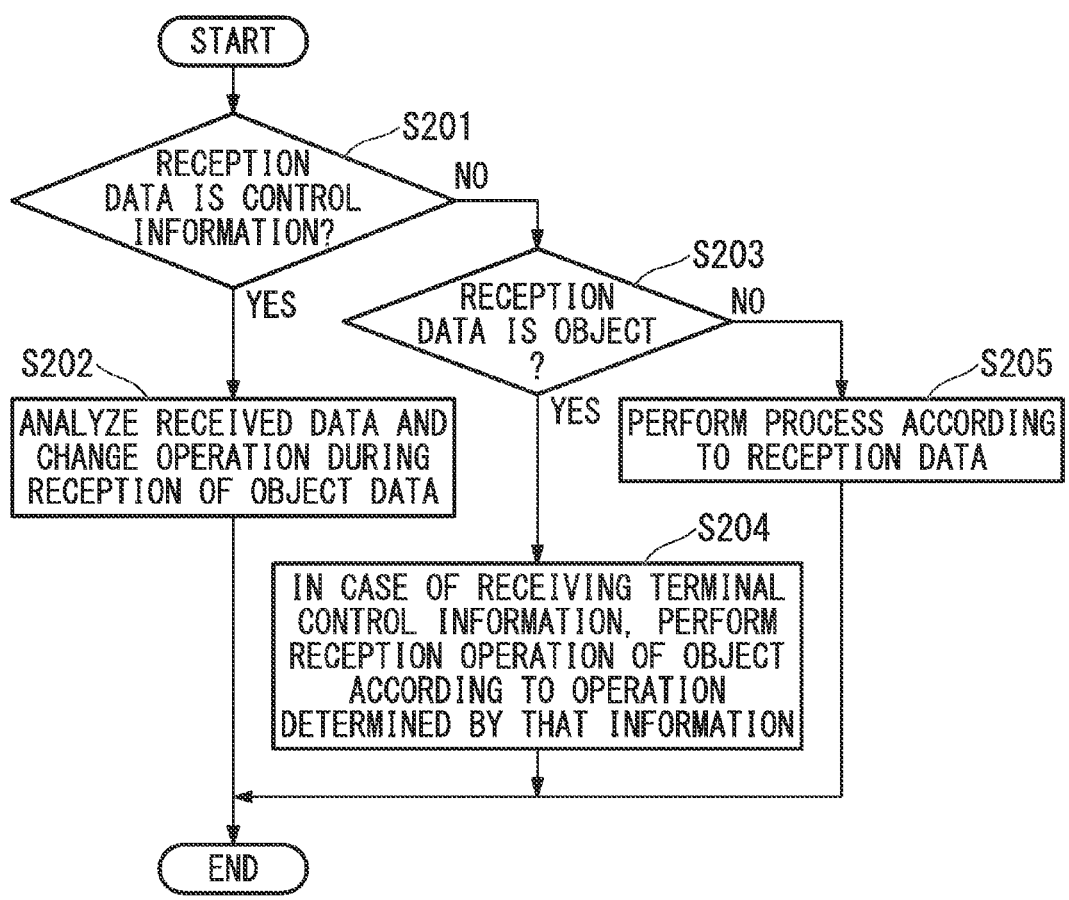
FIG. 10 is a flow chart illustrating a sequence in a reception process in a reception side terminal according to the present embodiment.
Figure 11:
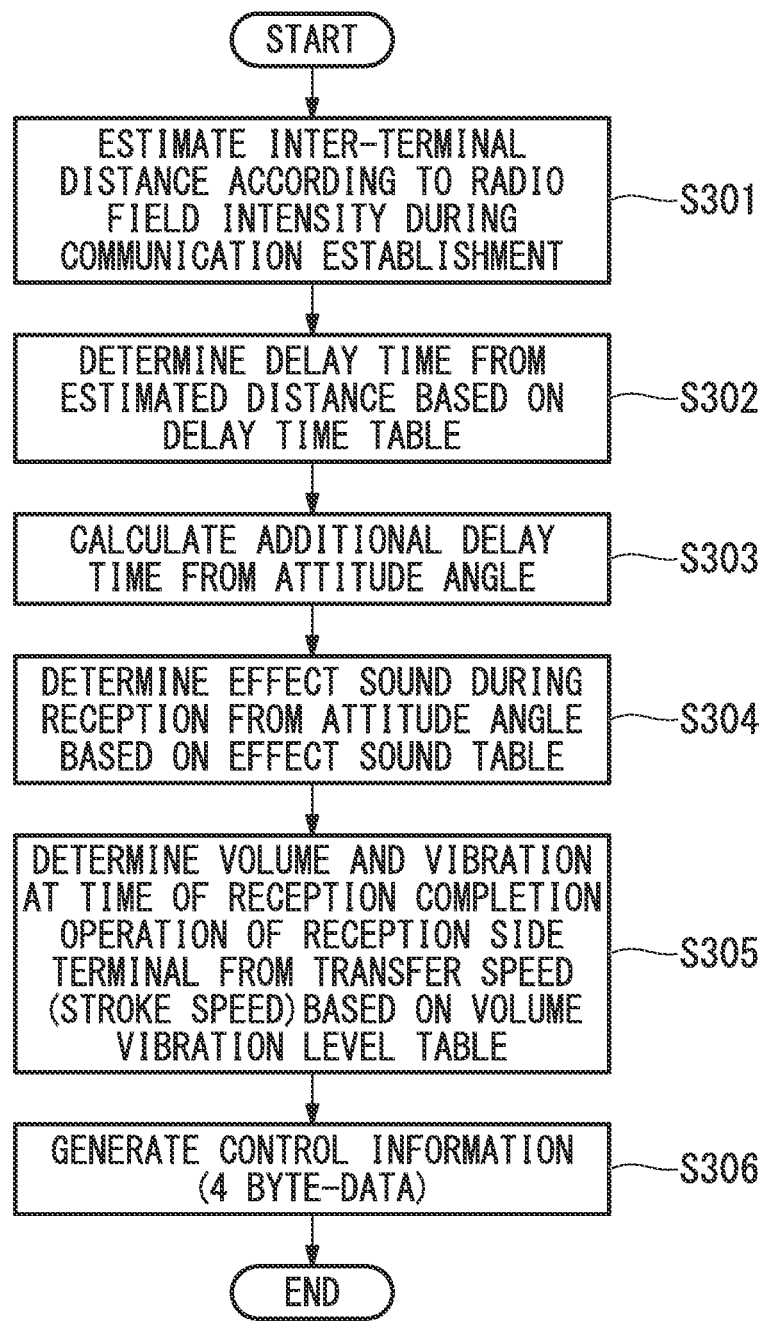
FIG. 11 is a flow chart illustrating a sequence in a control information generation process in the transmission side terminal according to the present embodiment.

Next, the transceiving process of the object by the terminal device 1 is described referring to FIGS. 9 to 11. Hereinafter, for the purpose of convenience of explanation, the terminal device 1 which transmits the object is denoted as the transmission side terminal 1*a*, and the terminal device 1 which receives the object is denoted as the reception side terminal 1*b*.

FIG. 9 is a flow chart illustrating a sequence in a transmission process in the transmission side terminal 1*a* according to the present embodiment.

Firstly, in step S101, the touch panel 107 receives an operation input of the selection and determination of the object to be transmitted (hereinafter, referred to as a transmission target object). Next, in step S102, the controller 101 causes the image that specifies the transmission target object to be displayed on the display 108. Then, in step S103, the transmission operation detection unit 11 determines whether the transmission operation is performed in the touch panel 107 region on the display 108. That is, the transmission operation detection unit 11 determines whether the stroke operation in the Y-axis positive direction is performed in the touch panel 107 region.

In a case where the transmission operation is performed, in step S104, the communication establishment unit 17 determines whether the communication with the reception side terminal 1*b* is established. In a case where the communication with the reception side terminal 1*b* is established, the process proceeds to step S106. On the other hand, in a case where the communication with the reception side terminal 1*b* is not established, in step S105, the communication establishment unit 17 establishes the communication with the reception side terminal 1*b* by transmitting the connection request to the reception side terminal 1*b* through the communication controller 112.

Next, in step S106, the control information generation unit 14 generates control information for the reception side terminal 1*b*. The detailed description of a method of generating the control information is made later. Then, in step S107, the control information transmission unit 15 transmits the control information that the control information generation unit 14 generates to the reception side terminal 1*b*. Lastly, in step S108, the data transmission unit 16 transmits the transmission target object to the reception side terminal 1*b*.

FIG. 10 is a flow chart illustrating a sequence in a reception process in a reception side terminal 1*b* according to the present embodiment.

Firstly, in step S201, it is determined whether data (hereinafter, referred to as reception data) that the control information reception unit 18 receives from the transmission side terminal 1a is control information. In a case where the reception data is the control information, in step S202, the operation setting at the time of reception of the object is changed based on the control information that the data reception operation setting unit 20 has received, and then the process is terminated.

Specifically, data reception operation setting unit 20 writes the received control information to the RAM 103.

On the other hand, in a case where the reception data is not the control information (No in step S201), in step S203, it is determined whether the data that the data reception unit 19 received is the object. In a case where the reception data is the object, in step S204, the data reception operation setting unit 20 performs the operation at the time of reception that is changed in step S202. Specifically, the data reception operation setting unit 20 reads the control information from the RAM 103, and performs the process based on the read control information. Here, the case of performing the process based on the control information shown in FIG. 6 is described as an example. Firstly, the data reception operation setting unit 20 reads audio data corresponding to the effect sound number "2" from the HDD 113, and outputs audio data that is read in the replaying volume corresponding to the volume level "3" to the audio codec 104. Then, the data reception operation setting unit 20 outputs to the vibration signal generator 109 the signal instructing the vibration having the vibration amplitude corresponding to the vibration level "3" to be generated. That is, the reception side terminal 1b reproduces the effect sound corresponding to the effect sound number "2" in the replaying volume corresponding to the volume level "3" at the time of reception of the object, and generates the vibration corresponding to the vibration level "3." Lastly, the data reception operation setting unit 20 displays the message indicating that the reception of the object is completed on the display 108 and notifies the user with the reception of the object after waiting for the delay time of "3" seconds from when the data reception unit 19 receives the object.

On the other hand, in a case where the reception data is not the object or control information (No in step S203), in step S205, the controller 101 performs a process according to the reception data.

FIG. 11 is a flow chart illustrating a sequence in a control information generation process in a transmission side terminal 1a according to the present embodiment.

Firstly, in step S301, the distance estimation unit 13 acquires a radio field intensity from the communication controller 112, and estimates an inter-terminal distance according to the acquired radio field intensity. Next, in step S302, the delay time setting unit 14a determines the delay time Td based on the inter-terminal distance that the distance estimation unit 13 estimates. Specifically, the delay time setting unit 14a reads the delay time Td corresponding to the inter-terminal distance from the delay time table.

Next, in step S303, the delay time setting unit 14a acquires attitude angle θ from the motion sensor 106, and determines an additional delay time Tadd based on the acquired attitude angle θ. Specifically, the delay time setting unit 14a calculates the additional delay time Tadd by the following expression (1). That is, the delay time setting unit 14a sets the additional delay time Tadd longer as the attitude angle θ is close to a right angle.

$$T\text{add} = \sin\theta \times 3 \quad (1)$$

Then, the delay time setting unit 14a adds the additional delay time Tadd to the delay time Td and sets the total time as the delay time in the control information.

Next, in step S304, the effect sound setting unit 14b acquires the attitude angle θ from the motion sensor 106, and determines the effect sound based on the acquired attitude angle θ. Specifically, the effect sound number corresponding to the acquired attitude angle θ is read from the effect sound table.

Next, in step S305, the speed detection unit 12 detects the transfer speed. Then, the volume level setting unit 14c reads the volume level corresponding to the transfer speed that the speed detection unit 12 has detected from the volume vibration level table. Further, the vibration level setting unit 14d reads the vibration level corresponding to the transfer speed that the speed detection unit 12 has detected from the volume vibration level table. Lastly, in step S306, the control information generation unit 14 generates control information that is 4 byte-data including the delay time that the delay time setting unit 14a has set, the effect sound number that the effect sound setting unit 14b has set, the volume level that the volume level setting unit 14c has set and the vibration level that the vibration level setting unit 14d has set, and terminates the process.

In this manner, the transmission side terminal 1a generates control information to control the operation when the reception side terminal 1b receives the object, based on the inter-terminal distance, the attitude angle and the transfer speed.

Figure 12:
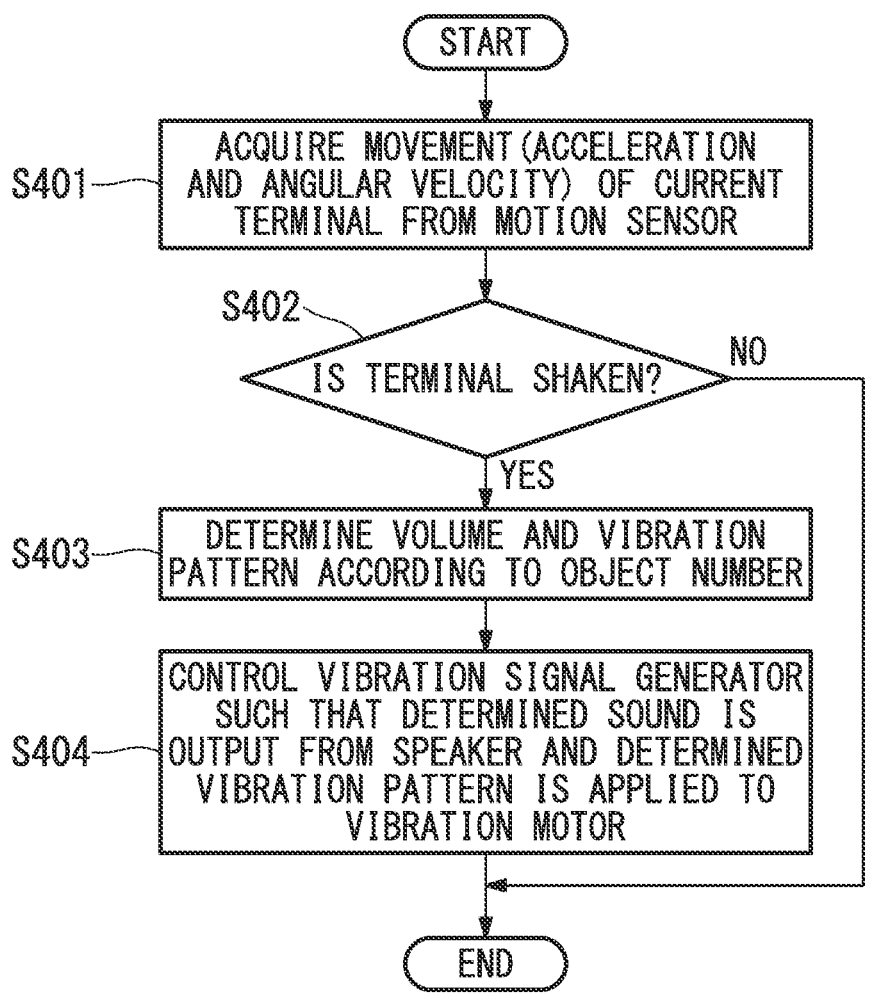
FIG. 12 is a flow chart illustrating a sequence in a confirmation process of the object amount according to the present embodiment.

Next, the confirmation process with respect to the object amount by the terminal device 1 is described referring to FIG. 12. FIG. 12 is a flow chart illustrating a sequence in the confirmation process with respect to the object amount according to the present embodiment.

Firstly, in step S401, the confirmation operation detection unit 21 acquires the movement (the acceleration and the angular velocity) of the current terminal from the motion sensor 106. Then, in step S402, the confirmation operation detection unit 21 determines whether the confirmation operation (the operation to shake the terminal device 1) with respect to the object amount has been performed from the acquired acceleration and the acquired angular velocity. In a case where the confirmation operation is performed, in step S403, the confirmation operation setting unit 22 determines the replaying volume and the vibration amplitude according to the object number that the HDD 113 stores. Specifically, the confirmation operation setting unit 22 reads the replaying volume and the vibration amplitude corresponding to the object number from the operation pattern table. Then, in step S404, the confirmation operation setting unit 22 outputs a predetermined audio data to the audio codec 104 in the determined replaying volume, and outputs to the vibration signal generator 109 the signal instructing the vibration having the determined vibration amplitude to be generated. Accordingly, the speaker 105 outputs the audio in the determined replaying volume, and the vibration motor 111 vibrates in the determined vibration amplitude. On the other hand, in a case where the confirmation operation is not performed (No in step S402), the process is terminated.

In this manner, the terminal device 1 generates the audio and the vibration according to the held object number, when the user shakes the terminal device 1. At this time, the terminal device 1 generates a large audio and vibration, as the object number that the terminal device 1 holds is large.

In this manner, in the terminal device 1 according to the present embodiment, when the display 108 displays the image that specifies the object, if the user performs the stroke operation in the touch panel 107 region toward the Y-axis positive direction, the terminal device 1 transmits the object to another terminal device 1. Further, in a case where the stroke operation is performed in the touch panel 107 region in the same predetermined direction as the direction in which another terminal device 1 is located, the terminal device 1 transmits the object to another terminal device 1. Accordingly, for example, the user is able to transmit the object by performing an intuitive operation such as flying the top card of playing cards that are held in the hand so that the loss in the operation does not occur. That is, it is possible for the user to transmit the object to another terminal device 1 in a simple and intuitive operation.

Further, the transmission side terminal 1a transmits the control information to another terminal device 1 prior to transmitting the object, and the reception side terminal 1b performs the operation at the time of reception of the object based on the control information. This enables the ability to produce a realistic sense by the sound, the vibration, and the like during the object transmission, and this makes it possible for the user to enjoy the act itself of transmitting or exchanging the object.

Further, if the user shakes the terminal device 1, the terminal device 1 generates the volume and the vibration corresponding to the object amount that is held. This makes it possible for the user to know the approximate amount of the object that the terminal device 1 holds without performing an operation to display the amount of the object that the terminal device 1 holds from the menu.

Further, the transceiving process and a confirmation process of the object may be performed by storing the program which implements each step shown in FIGS. 9 to 12 in a computer-readable recording medium, and reading and implementing the program stored in the recording medium by the computer system. In addition, the "computer system" described here may include an OS and hardware such as peripheral equipment.

Further, in a case of using a WWW system, the "computer system" is regarded to also include a home page providing environment (or display environment).

Further, the "computer-readable recording medium" means a re-writable non-volatile memory such as a flexible disc, a magneto optical disc, a ROM, and a flash memory, a recording medium such as a CD-ROM, and storage such as a hard disc that is built in the computer system.

Further, "the computer-readable recording medium" includes a medium which holds a program for a certain period of time such as a volatile memory (for example, a DRAM (Dynamic Random Access Memory)) inside the computer system which serves as a server or a client in a case where the program is transmitted through a network such as the Internet or a communication line such as a telephone line.

Further, the program may be transmitted to another computer system from the computer system which stores the program in a memory through a transmission medium or a transmission wave out of the transmission medium. Here, the "transmission medium" which transmits the program means a medium having a function to transmit information, such as a network (a communication network) such as the Internet or a communication line (a communication wire) such as a telephone line.

Further, the program may implement a part of the aforementioned functions.

Furthermore, the program may be a so-called difference file (a difference program) that is realized by combining the aforementioned functions with the program that is stored in advance in a computer system.

Hitherto, an embodiment of the present invention has been described in detail referring to the drawings, but the specific configuration is not limited to the aforementioned example, and various changes in design are possible within the scope without departing the spirit of the invention.

For example, in the aforementioned embodiment, the distance estimation unit 13 estimates the inter-terminal distance according to the radio field intensity, but may estimate the inter-terminal distance based on the position information according to GPS (Global Positioning System). In this case, the distance estimation unit 13 transmits data requesting position information to another terminal device 1 through the communication controller 112 to acquire the position information of another terminal device 1.

Further, the transmission operation detection unit 11 calculates the direction of another terminal device 1 based on the position information by the GPS, and in a case where the stroke operation in the calculated direction is performed, the transmission operation detection unit 11 may determine that the transmission operation has been performed with respect to the object.

Further, in the aforementioned embodiment, the delay time setting unit 14a sets the delay time based on the inter-terminal distance and the attitude angle. However, the delay time setting unit 14a may set the delay time based on the transfer speed. In this case, the delay time setting unit 14a sets the delay time short as the transfer speed is faster, and sets the delay time long as the transfer speed is slower.

Further, in the aforementioned embodiment, the terminal device 1 determined the replaying volume and the vibration amplitude according to the object number at the time of a confirmation operation of the object amount. However, the terminal device 1 may determine the replaying volume and the vibration amplitude according to the total capacity that the HDD 113 stores. Otherwise, the terminal device 1 may determine the replaying volume and the vibration amplitude according to the object number or the capacity that is received from the transmission side terminal 1a.

Figure 13:
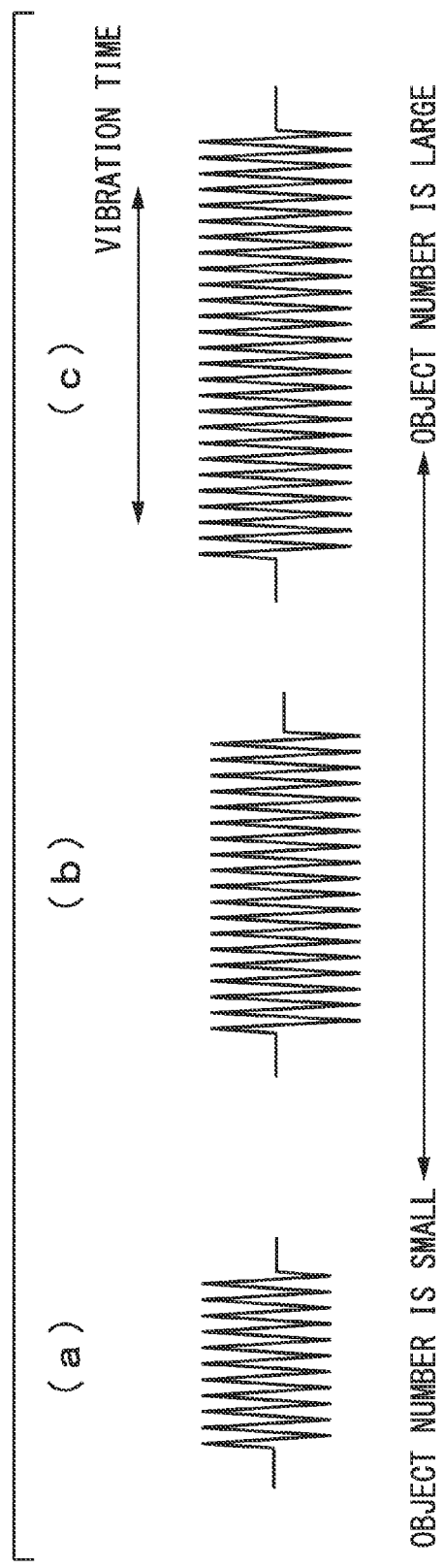
FIG. 13 is an image diagram illustrating another example of the vibration pattern at the time of the confirmation operation of the object amount.

Further, in the aforementioned embodiment, the terminal device 1 determined the vibration amplitude according to the object amount at the time of a confirmation operation of the object amount. However, the terminal device 1 may determine the vibration time according to the object amount. FIG. 13 is an image diagram illustrating another example of a vibration pattern at the time of the confirmation operation of an object amount. FIG. 13(*a*) represents an image diagram of the vibration generated when the object number is small. Further, FIG. 13(*b*) represents an image diagram of a vibration generated when the object number is a typical value. Further, FIG. 13(*c*) represents an image diagram of a vibration generated when the object number is large. The vibration time shown in FIG. 13(*a*) is shorter than the vibration time shown in FIG. 13(*b*). The vibration time shown in FIG. 13(*b*) is shorter than the vibration time shown in FIG. 13(*c*). That is, the larger the object amount is, the larger the vibration time at a time of the confirmation operation is, and the smaller the object amount is, the shorter the vibration time at a time of the confirmation operation is.

What is claimed is:
1. An electronic device comprising:
a display which displays an image that specifies data,
a touch panel which is disposed on the display and detects a contact of an object,
a transmission operation detection unit which, when the display displays the image that specifies data, detects that a transmission operation to transmit the data has been performed if the touch panel detects a contact that continues over at least a predetermined distance, a transmission unit which, if the transmission operation detection unit detects the transmission operation, transmits to another electronic device the data and control information to control an operation when the another electronic device receives the data, a distance estimation unit which determines a distance from the another electronic device, and a delay time setting unit which sets a delay time which is a time from when the another electronic device receives the data until when a user of the another electronic device is notified with a reception of the data, based on the distance that the distance estimation unit estimated, wherein the control information comprises the delay time that the delay time setting unit has set.

2. The electronic device according to claim 1,
wherein the delay time setting unit sets the delay time longer, as the distance that the distance estimation unit estimated is longer.

3. The electronic device according to claim 1, further comprising:
a motion sensor which detects power that acts on the electronic device,
a vibration element which vibrates based on a vibration waveform,
a memory which stores the data,
a confirmation operation detection unit which detects a confirmation operation with respect to a volume of the data, based on the power that the motion sensor detected, and
a confirmation operation setting unit which, when the confirmation operation detection unit detects the confirmation operation, outputs the vibration waveform corresponding to the volume of the data that the memory stores to the vibration element.

4. An electronic device comprising:
a display which displays an image that specifies data,
a touch panel which is disposed on the display and detects a contact of an object,
a transmission operation detection unit which, when the display displays the image that specifies data, detects that a transmission operation to transmit the data has been performed if the touch panel detects a contact that continues over at least a predetermined distance,
a transmission unit which, if the transmission operation detection unit detects the transmission operation, transmits to another electronic device the data and control information to control an operation when the another electronic device receives the data,
an attitude angle detection unit which detects an attitude angle which is an angle of the electronic device with respect to a horizontal direction, and
a delay time setting unit which sets a delay time which is a time from when the another electronic device receives the data until when a user of the another electronic device is notified with a reception of the data, based on the angle that the attitude angle detection unit detected,
wherein the control information comprises the delay time that the delay time setting unit has set.

5. The electronic device according to claim 4,
wherein the delay time setting unit sets the delay time longer, as the attitude angle that the attitude angle detection unit detected is closer to a right angle.

6. An electronic device comprising:
a display which displays an image that specifies data,
a touch panel which is disposed on the display and detects a contact of an object,
a transmission operation detection unit which, when the display displays the image that specifies data, detects that a transmission operation to transmit the data has been performed if the touch panel detects a contact that continues over at least a predetermined distance and is in a predetermined direction,
a data transmission unit which, when the transmission operation detection unit detects the transmission operation, transmits the data to another electronic device,
a control information transmission unit that, when the data transmission unit transmits the data, transmits control information in order to control an operation which indicates that the another electronic device has received the data,
a distance estimation unit which determines a distance from the another electronic device, and
a delay time setting unit which sets a delay time which is a time from when the another electronic device receives the data until when a user of the another electronic device is notified with a reception of the data, based on a distance that the distance estimation unit estimated,
wherein the control information transmitted by the control information transmission unit to the another electronic device includes the delay time that the delay time setting unit has set.

7. The electronic device according to claim 6,
wherein the transmission operation detection unit, when the predetermined direction is same as a direction in which the another electronic device is located, detects that the transmission operation to transmit the data has been performed.

8. The electronic device according to claim 6, further comprising:
a speed detection unit which detects a speed of the transmission operation based on a position and a time in which the touch panel detected the contact,
a volume level setting unit which sets a replaying volume of an effect sound that is replayed when the another electronic device receives the data, based on the speed that the speed detection unit detected, and
a vibration level setting unit which sets a dimension of vibration that is generated when the another electronic device receives the data, based on the speed that the speed detection unit detected,
wherein the control information transmitted by the control information transmission unit to the another electronic device includes the replaying volume that the volume level setting unit has set and the dimension of vibration that the vibration level setting unit has set.

9. The electronic device according to claim 8, further comprising:
an attitude angle detection unit which detects an attitude angle that is an angle of the electronic device with respect to a horizontal direction, and
an effect sound setting unit which sets an effect sound that is replayed when the another electronic device receives the data, based on the attitude angle that the attitude angle detection unit detected,
wherein the control information transmitted by the control information transmission unit to the another electronic device includes identification information of the effect sound that the effect sound setting unit has set.

10. The electronic device according to claim 6, further comprising:
an attitude angle detection unit which detects an attitude angle that is an angle of the electronic device with respect to a horizontal direction,
wherein the delay time setting unit sets the delay time longer, as the distance that the distance estimation unit estimated is longer or the attitude angle that the attitude angle detection unit detected is closer to a right angle.

11. An electronic device comprising:
a data reception unit which receives data from another electronic device,
a control information reception unit which receives control information to control an operation which indicates that the data has been received from the another electronic device, and
a data reception operation setting unit which, when the data reception unit receives the data, performs an operation based on the control information that the control information reception unit received,
wherein the data reception operation setting unit, when the control information reception unit receives the control information comprising a delay time, notifies a user with a reception of the data after the delay time has passed from when the data reception unit has received the data.

12. The electronic device according to claim 11, further comprising:
a speaker, and
a vibration element which vibrates based on a vibration waveform,
wherein the data reception operation setting unit, when the control information reception unit receives the control information comprising a replaying volume, reproduces an effect sound with the replaying volume from the speaker if the data reception unit receives the data, and when the control information reception unit receives the control information comprising a dimension of vibration, outputs the vibration waveform to the vibration element based on the dimension of the vibration if the data reception unit receives the data.

13. The electronic device according to claim 11, further comprising:
a speaker,
wherein the data reception operation setting unit, when the control information reception unit receives the control information comprising identification information of an effect sound, replays the effect sound from the speaker if the data reception unit receives the data.

14. A method of data transmission comprising:
detecting by a transmission operation detection unit of an electronic device that a transmission operation to transmit data has been performed if a touch panel detects a contact that continues over at least a predetermined distance and is in a predetermined direction, when a display displays an image that specifies data, the electronic device comprising the display which displays the image that specifies data, and the touch panel which is disposed on the display and detects a contact of an object,
transmitting the data to another electronic device by a data transmission unit of the electronic device when the transmission operation detection unit detects the transmission operation,
when the data transmission unit transmits the data, transmitting control information in order to control an operation which indicates that the another electronic device has received the data,
determining a distance from the another electronic device with a distance estimation unit, and
setting, with a delay time setting unit, a delay time which is a time from when the another electronic device receives the data until when a user of the another electronic device is notified with a reception of the data, based on the distance that the distance estimation unit estimated,
wherein the control information transmitted by the control information transmission unit to the another electronic device includes the delay time that the delay time setting unit has set.

* * * * *